United States Patent
Jiang

(10) Patent No.: US 6,668,179 B2
(45) Date of Patent: Dec. 23, 2003

(54) SPECIAL BATTERY RESERVE OF PORTABLE ELECTRONIC DEVICES FOR EMERGENCY USE

(75) Inventor: Peng Jiang, Calgary (CA)

(73) Assignee: Intel Corporation, Santa Clara, CA (US)

( * ) Notice: Subject to any disclaimer, the term of this patent is extended or adjusted under 35 U.S.C. 154(b) by 391 days.

(21) Appl. No.: 09/731,734

(22) Filed: Dec. 8, 2000

(65) Prior Publication Data

US 2002/0077159 A1 Jun. 20, 2002

(51) Int. Cl.⁷ .................................................. H04Q 7/20
(52) U.S. Cl. ........................ 455/572; 455/573; 455/574; 455/404; 455/404.1
(58) Field of Search .................................. 455/404, 550, 455/572, 524, 573–574, 38.3, 404.1

(56) References Cited

U.S. PATENT DOCUMENTS

| | | | |
|---|---|---|---|
| 6,058,320 A | * | 5/2000 | Yokota ......................... 455/574 |
| 6,249,107 B1 | * | 6/2001 | Wolfe ........................... 320/150 |
| 6,345,180 B1 | * | 2/2002 | Reichelt ....................... 455/404 |
| 6,427,072 B1 | * | 7/2002 | Reichelt ....................... 455/404 |

* cited by examiner

*Primary Examiner*—William Trost
*Assistant Examiner*—Brandon J Miller
(74) *Attorney, Agent, or Firm*—Schwegman, Lundberg, Woessner & Kluth, P.A.

(57) ABSTRACT

A portable electronic device such as a cellular or mobile telephone having a special battery reserve feature for emergency use is disclosed. Such a cellular or mobile telephone comprises a battery; a battery detector arranged to detect a battery power of the battery as a power source of the portable telephone and produce battery power information $V_d$ indicating the detected power value; a memory comprising a program storage area which stores an application software including a special battery reserve for emergency use, and a data storage area which serves as a working memory for storing relevant information, including power setting information $V_s$ of the battery; and a host controller arranged to control operations of the telephone, including the special battery reserve for emergency use, when the battery power information $V_d$ indicating the detected power value approaches the power setting information $V_s$ of the battery.

21 Claims, 7 Drawing Sheets

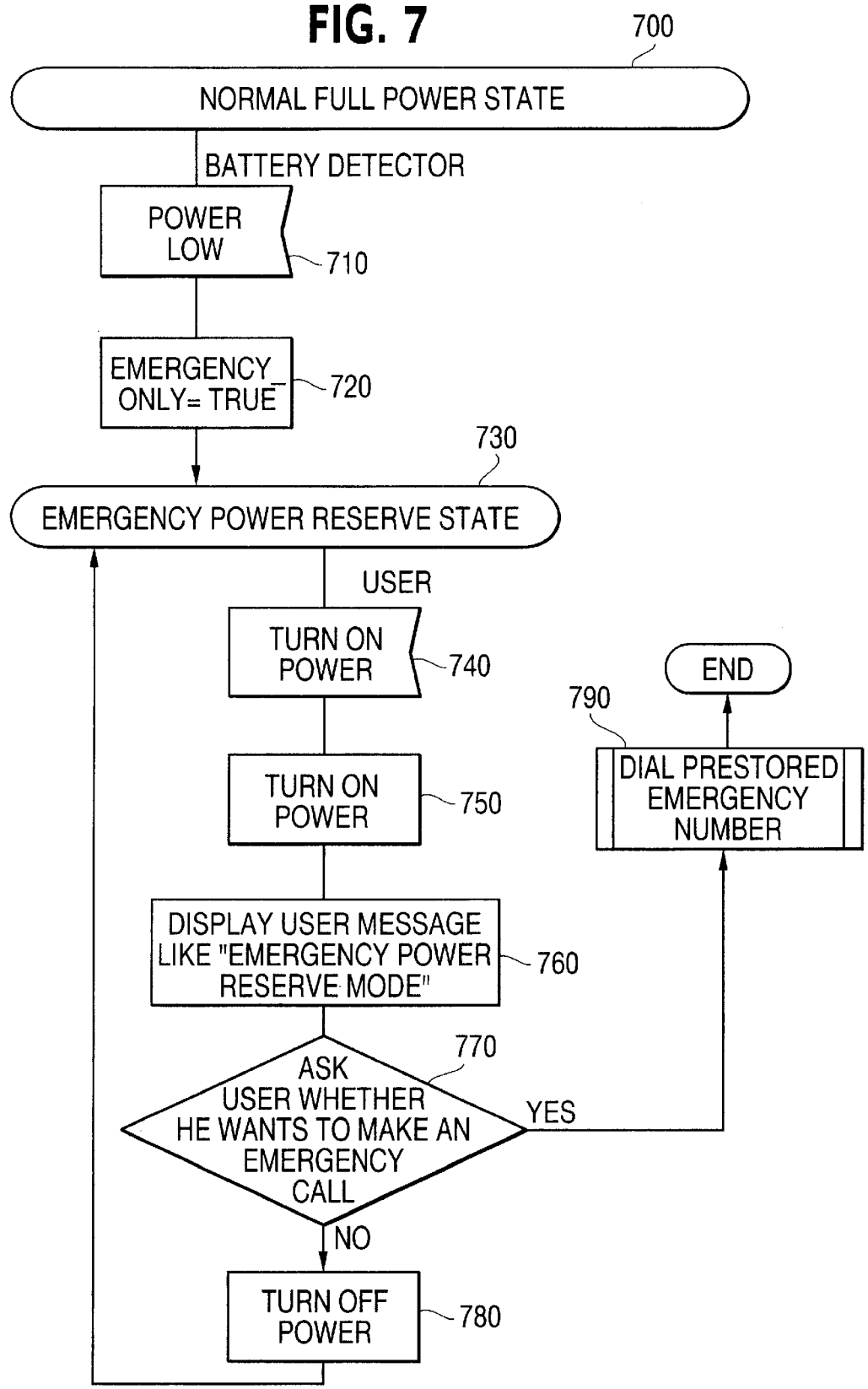

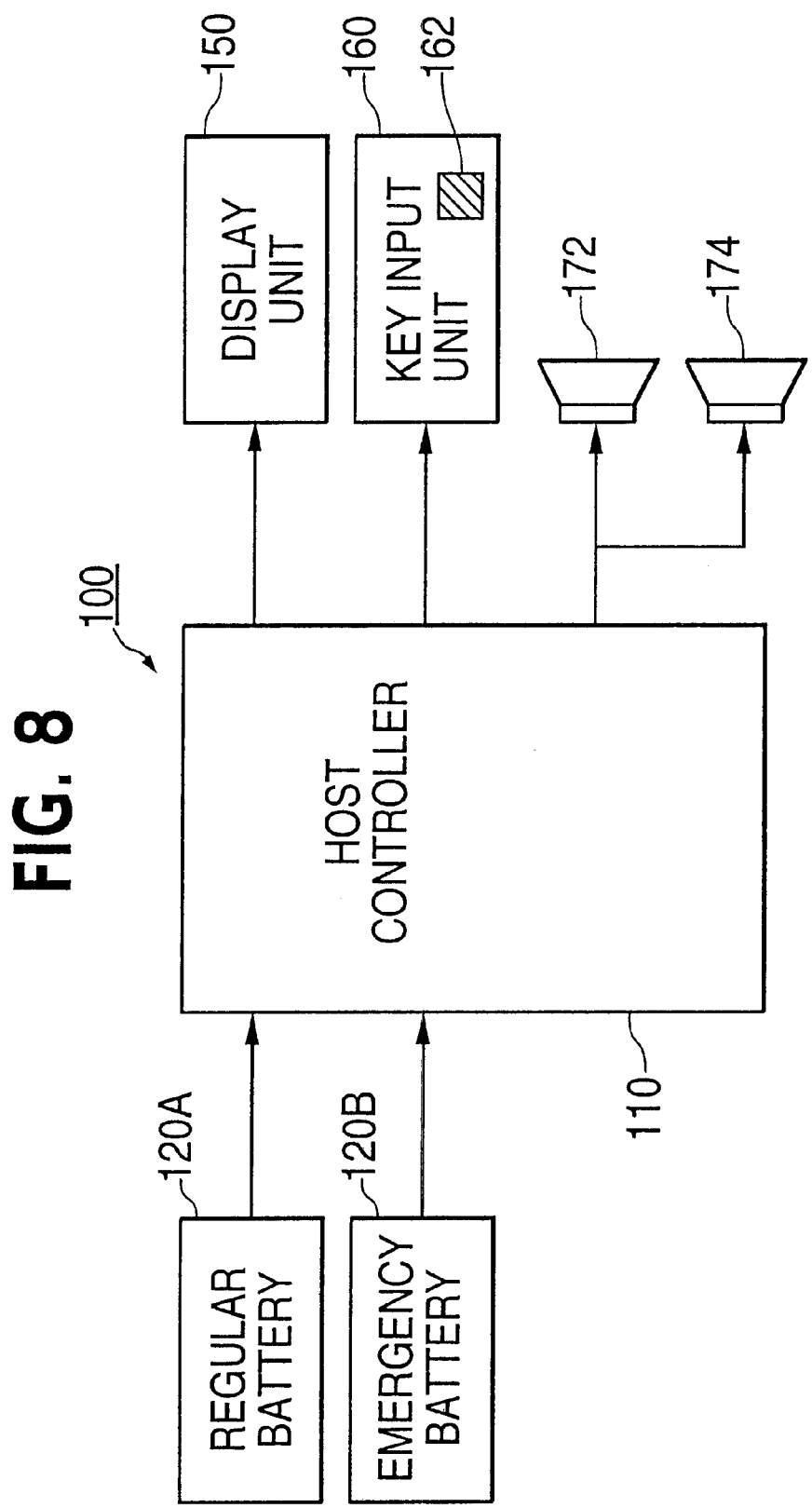

SPECIAL BATTERY RESERVE OF PORTABLE ELECTRONIC DEVICES FOR EMERGENCY USE

TECHNICAL FIELD

The present invention relates to portable electronic devices such as cellular or mobile telephones which utilize batteries, and more particularly, relates to methods and apparatus for the management of the batteries of such portable electronic devices.

BACKGROUND

Portable electronic devices such as wireless terminal devices, also known as cellular or mobile telephones, are ubiquitous in modern society. Cellular or mobile telephones are becoming more portable and easier to use all the time, and customers (users) are now relying daily on the availability of these cellular or mobile telephones to accommodate their communication needs. These cellular telephones are typically driven by batteries of different battery storage capacities, often based on sizes and battery technologies. Therefore the challenges for these cellular telephones are to manage the battery power efficiently and to extend the battery life as long as possible both in the talk (transmit) mode and standby (idle) mode.

Many advanced wireless systems incorporate battery power management features which not only conserve battery power by minimizing mobile system processing, particularly during the standby mode, but also allow the user to gauge the remaining battery life and alert the user to the run-down of a battery with either an audible alert message or a vibration for subsequent recharge operations Either situation however, when the battery is run-down (dead), the user has no choice but to recharge the battery before usage. For many cellular telephones, the battery may last only 1 to 2 hours of talk time when used in the cellular system. As a result, the user is often left with a useless cellular telephone without any battery power in cases of emergency situations when such a cellular telephone is needed most.

Therefore, there is a strong need for an inexpensive, more effective and efficient avenue to ensure that a portable electronic device such as a cellular telephone is always available for use in cases of emergency, and that the user always has access to such a cellular telephone in cases of emergency regardless of the conditions of its battery.

BRIEF DESCRIPTION OF THE DRAWINGS

A more complete appreciation of exemplary embodiments of the present invention, and many of the attendant advantages of the present invention, will be readily appreciated as the same becomes better understood by reference to the following detailed description when considered in conjunction with the accompanying drawings in which like reference symbols indicate the same or similar components, wherein:

FIG. 7 illustrates a software diagram of a host controller having a special battery reserve feature for emergency use without an "EMERGENCY" button according to another embodiment of the present invention; and FIG. 8 illustrates an example block diagram of a cellular telephone having a special battery reserve feature for emergency use according to yet another embodiment of the present invention.

DETAILED DESCRIPTION

The present invention is applicable for use with all types of portable electronic devices and wireless terminal devices which utilize batteries for data communications. Examples of such portable electronic devices and wireless terminal devices may include both analog and digital mobile or cellular phones, pagers, wireless portable digital assistants (PDAs), and other portable consumer electronics. However, for the sake of simplicity, discussions will concentrate mainly on the mobile or cellular phones using batteries, although the scope of the present invention is not limited thereto.

Figure 1:
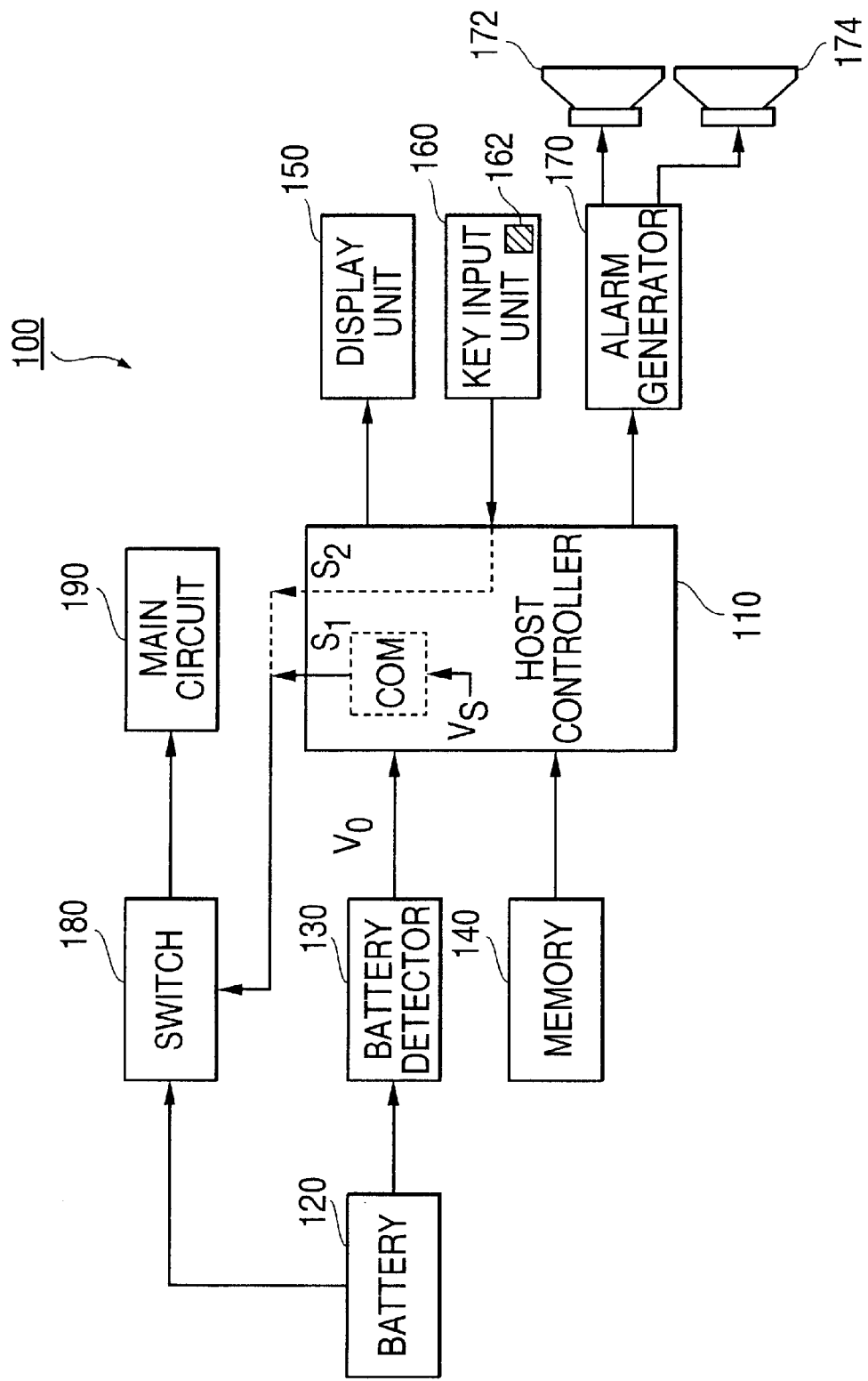
FIG. 1 illustrates an example block diagram of a portable electronic device such as a cellular telephone having a special battery reserve feature for emergency use according to an embodiment of present invention.

Attention now is directed to the drawings and particularly to FIG. 1, in which a portable electronic device such as a cellular telephone having a special battery reserve feature for emergency use according to an embodiment of the present invention is illustrated. The special battery reserve feature advantageously reserves a special portion, for example, 5% or 10% of the battery to be used only for emergency situations. This way the cellular phone is always assured to have sufficient battery power to make emergency calls, even when the battery of the cellular phone is dead for all other purposes (i.e., regular calls). The emergency numbers include, for example, an emergency 911 number which is linked to a public 911 emergency system utilized to identify the location of the cellular telephone, and any other pre-stored emergency numbers that the user deems appropriate for emergency use. These emergency numbers may be set or reset by a user from a user menu provided on a display. The battery used in such a cellular telephone may include, for example, Alkaline, Nickel Cadmium (NiCD), Nickel Metal Hydride (NiMH), Lithium Ion (Li-Ion) and Zinc Air. Each of these batteries has a battery storage capacity that varies dependent on its size and battery technology. Therefore, the special battery reserve feature of such a cellular telephone may need some adjustments for low battery indications depending on the battery used.

As shown in FIG. 1, the cellular telephone 100 may comprise a host controller 110, a battery 120, a battery detector 130, a memory 140, a display unit 150, a key input unit 160, an alarm generator 170, a switch 180 and a main circuit 190 arranged to control operations of the cellular telephone 100.

Host controller 110 is arranged to interact with the battery detector 130, the memory 140, the display unit 150, the key input unit 160, the alarm generator 170, the switch 180 and the main circuit 190 and support the main circuit 190 to control operations of the cellular telephone 100, particularly the special battery reserve feature for emergency use according to an embodiment of the present invention.

Battery 120, as previously discussed, may be one of an Alkaline, Nickel Cadmium (NiCD), Nickel Metal Hydride (NiMH), Lithium Ion (Li-Ion) and Zinc Air type of battery, and has a battery storage capacity that varies dependent on its size and battery technology. Such a battery 120 may be removable from the cellular telephone 100 for either replacement or rechargeable purposes.

Battery detector 130 is connected to the battery 120 to detect the battery power (e.g., voltage or current) of the battery 120 as a power source of the cellular telephone 100 and produce battery power information $V_d$ indicating the detected power value in either an analog or digital form.

Memory 140 may contain a program storage area 142 and a data storage are 144. The program storage area 142 may include a Read-Only-Memory (ROM) for storing an operating system (OS) and an application software including a special battery reserve feature for emergency use according to an embodiment of the present invention. The data storage area 144 may include a Random-Access-Memory (RAM) which serves as a working memory for storing relevant data, including power (e.g., voltage or current) setting information $V_S$ for designating a battery power value at which an alarm is given informing that the battery power information $V_d$ indicating the detected power value approaches the lowest usable voltage or current (e.g., 5% or 10% of the battery power) of the battery 120. Such power setting information $V_S$ serves as a reference for the battery power information $V_d$, and may be set and varied by the user, via the key input unit 160. The memory 140 may also be permanently incorporated into the host controller 110.

Display unit 150 may be a Liquid Crystal Display (LCD) for providing a visual display of visible information such as letters, symbols or the like necessary for the user to operate the cellular telephone 100, including using the special battery reserve feature for emergency use according to an embodiment of the present invention.

Key input unit 160 may include a number of keys corresponding to alphabets/numbers for the user to input relevant data, and other well-known function keys. Such a key input unit 160 may also include a special "EMERGENCY" button 162 implemented to function only when regular battery power runs out, that is, when the battery power information $V_d$ indicating the detected power value from the battery detector 130 approaches the power setting information $V_S$ (the lowest usable voltage or current e.g., 5% or 10% of the battery power) of the battery 120. If such an "EMERGENCY" button 162 is implemented as part of the key input unit 160, then the user may use the special battery reserve feature by simply pressing the "EMERGENCY" button, particularly after the regular battery power has run out which renders the cellular telephone 100 inoperable for purposes of making regular telephone calls.

Alarm generator 170 may include a speaker 172 and a buzzer 174 for sounding an alarm or a vibration to alert the user of low battery power, when the battery power information $V_D$ indicating the detected power value from the battery detector 130 approaches the power setting information $V_S$ (the lowest usable voltage or current e.g., 5% or 10% of the battery power) of the battery 120.

Switch 180 is arranged to operate to either permit or stop the feed of battery power from the battery 110 to the main circuit 190 of the cellular telephone 100, upon receipt of a switch control signal S1 from the host controller 110 or a switch control signal S2 from the key input unit 160, via the host controller 110.

The host controller 110 may include a comparator 112 arranged to make a comparison between the battery power information $V_d$ indicating the detected power value from the battery detector 130 and the power setting information $V_S$ set by the user, and generate a low battery indication signal when the battery power information $V_d$ indicating the detected power value reaches the power setting information $V_s$. Then the alarm generator 170 may, in response to the low battery indication signal, alert the user of such a low battery indication by either blipping, via the speaker 172, or a number of vibrations, via the buzzer 174.

The display unit 150 and the key input unit 160 may also serve as input/output means for various types of information associated with call originating and call incoming which are functions inherent in the cellular telephone. The construction and function of the other components of the cellular telephone are feasible using a well-known technique, and, hence, the explanation thereof will be omitted.

Figure 2:
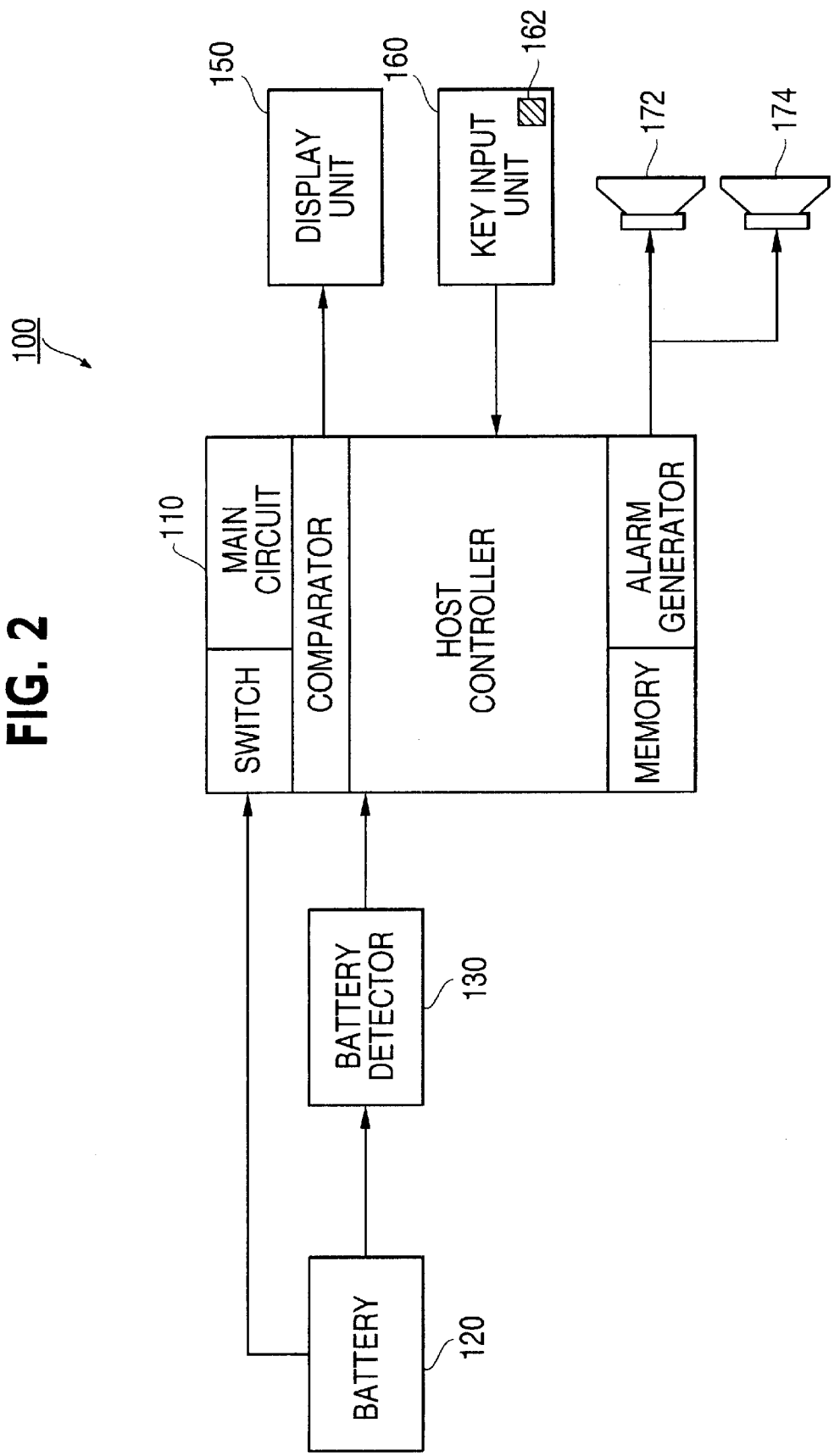
FIG. 2 illustrates an example block diagram of a portable electronic device such as a cellular telephone having a special battery reserve feature for emergency use according to another embodiment of the present invention.

FIG. 2 illustrates an example block diagram of a portable electronic device such as a cellular telephone having a special battery reserve feature for emergency use according to another embodiment of the present invention. As shown in FIG. 2, the memory 140, the alert generator 170, the switch 180 and the main circuit 190 may be integrated into the host controller 110 such that the host controller 110 is now configured to control all operations of the cellular telephone 100, including the use of the special battery reserve feature for emergency use according to an embodiment of the present invention. For example, an application software written specifically for controlling the power supply from the battery 120, including the use of the special battery reserve feature for emergency use may be downloaded into a host operating system (OS) of the host controller 110, via Internet or from a tangible medium, such as a floppy disk, a compact disk (CD) ROM, or may also be bundled with the existing operating system (OS) which may be activated by first battery power. Alternatively, the application software may also be available as a firmware module or a comprehensive hardware/software module which may be built-in the host controller 110 to control all operations of the cellular telephone 100.

Figure 3:
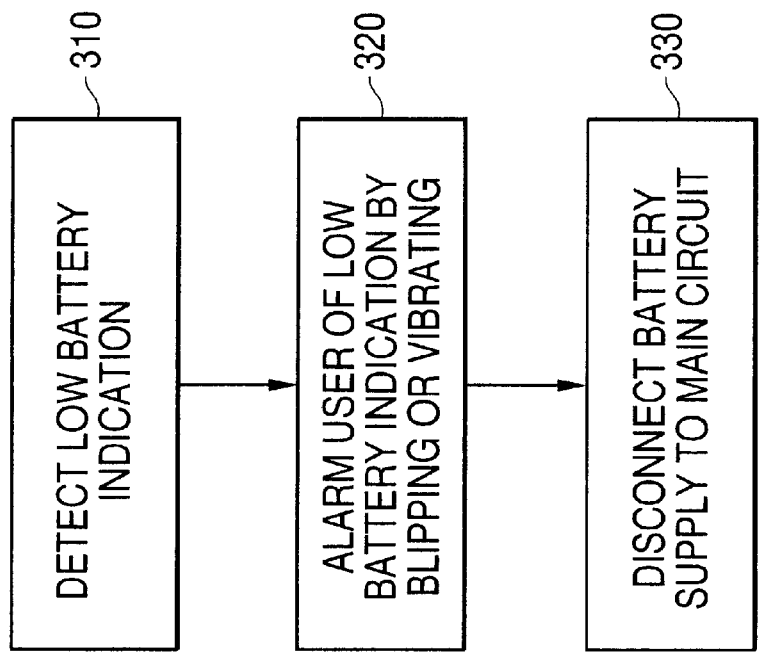
FIG. 3 illustrates a functional diagram of a host controller according to an embodiment of the present invention.

In either embodiment shown in FIGS. 1 and 2, the host controller 110 may be implemented with a special battery reserve feature for emergency use according to an embodiment of the present invention. As shown in FIG. 3, the host controller 110 may be configured to (constantly or intermittently) monitor and detect a low battery indication, when the battery power information $V_d$ indicating the detected power value from the battery detector 130 reaches the power setting information $V_S$ at block 310, alert the user of such a low battery indication by either blipping, via the speaker 172, or a number of vibrations, via the buzzer 174 at block 320, and then automatically disconnect the battery supply from the battery 120 to the main circuit 190 so as to disable operation of the cellular telephone 100 for purposes of making regular telephone calls at block 330.

More specifically, the operation of the special battery reserve feature for emergency use according to an embodiment of the present invention will be explained hereinbelow.

First, the battery detector 130 detects the power level (e.g., voltage or current) of the battery 120 and sends the battery power information $S_D$ to the host controller 110. The key input unit 150, when keyed by a user, can vary, through the host controller 110, the power setting information $V_S$ and the alarm setting information stored in the memory 140. In interlocking with the setting of the power setting information $V_S$, the time taken from the beginning of alarming to the stop of feed of battery power from the battery 120 into the main circuit 190 is automatically set. The alarm setting information may be selected from continuous sounding of an alarm, intermittent sounding of an alarm, and flashing of a light instead of sounding of the alarm and the like.

At the outset, the case where sounding of an alarm through the speaker 172 has been selected as the alarm setting information will be explained. The host controller 110 reads out the power setting information $V_s$ from the memory 140, compares the power setting information $V_s$ with the battery power information $V_D$ from the battery detector 130, and, when the power level (e.g., voltage or current) in the battery power information $V_D$ indicating the detected power value is higher than the power level in the power setting information $V_S$ (that is, when the battery power information $V_d$ indicating the detected power value is above the lowest usable voltage or current e.g., 5% or 10% of the battery power of the battery 120), energizes the switch 180 so that the battery power is fed into the main circuit 190 for making regular telephone calls. In this case, the alarm is not sounded.

On the other hand, when the power level in the battery power information $V_D$ indicating the detected power value is lower than or equal to the power level in the power setting information $V_S$ (that is, when the battery power information $V_d$ indicating the detected power value reaches the lowest usable voltage or current e.g., 5% or 10% of the battery power of the battery 120), the host controller 110 reads out the alarm setting information from the memory 140, and outputs the alarm sound signal based on the alarm setting information to sound an alarm through the speaker 172. At or about the same time, based on the power setting information $V_S$, after the sounding the alarm, the host controller 110 outputs a switch control signal S1 so that the switch 180 switches from the feed of battery power to the stop of the feed of battery power from the battery 120 to the main circuit 190 so as to disable all operations of the cellular telephone 100 for purposes of making regular calls.

Method and means for setting various types of information and alarming will be explained in more detail. Incorporation of the setting of the power setting information $V_S$ and the alarm setting information, into software, as one of functions of the cellular telephone 100 enables the user to vary the setting while watching a setting screen displayed on the display unit 150.

The value of the power setting information $V_S$, which can be set by the user, may be, for example, an integer in any permissible range, and, upon input of the numerical value from the key input unit 160, the numerical value is stored as the power setting information $V_S$ in the memory 140. In the host controller 110, the power setting information $V_S$ set in the memory 140 is compared with the battery power information $V_D$ indicating the power level of the battery 120.

In another embodiment of setting, the user may set information that the battery power alarm is sounded what minutes before the residual capacity of the battery 120 becomes zero (the battery becomes unusable due to lowering of voltage or current). The time may be selected from 0 to 5 min in 1 min increments. That the present time is what minutes before the residual capacity of the battery 120 becomes zero can be estimated to some extent based on the battery power at that time. In this embodiment of setting as well, the power setting information $V_S$ stored in the memory 140 is converted to a numerical value in the same permissible range, although the screen in the setting by the user may be displayed so that the time value is input.

Next, regarding the alarm setting information, the user may select one information from the choices displayed on the screen. The choices include no alarm, alarm via the speaker 172 or via the buzzer 174, flashing of lamp and the like. In this case, for no alarm, the alarm for the residual capacity of the battery is not sounded at all; for alarm, the alarm for the residual capacity of the battery is sounded, for example, every 5 sec or 10 sec. For flashing of light, the call incoming lamp may be flashed instead of the sounding of the alarm.

Regarding the method for giving the alarm, for the battery power, to the user, playing of music, increase or decrease in number of times of sounding, narrowing of sounding intervals and the like may be mentioned in addition to the above-described no alarm, alarm, and flashing of light. During waiting, the alarm for the battery power is sounded through a speaker 172 for information, while, during talking over the portable electronic device such as the cellular telephone, the alarm for the battery power is sounded through a receiver (not shown). When sounding the alarm through the speaker 172, the host controller 110 outputs alarm sound signal to the speaker 172. Similarly, when sounding the alarm through the receiver (not shown), the host controller 110 outputs alarm sound signal to the receiver (not shown). In the case of the lighting (or flashing) of light, the call incoming lamp may be lighted (or flashed) independently of whether the cellular telephone is in the state of waiting or talking.

Figure 4:
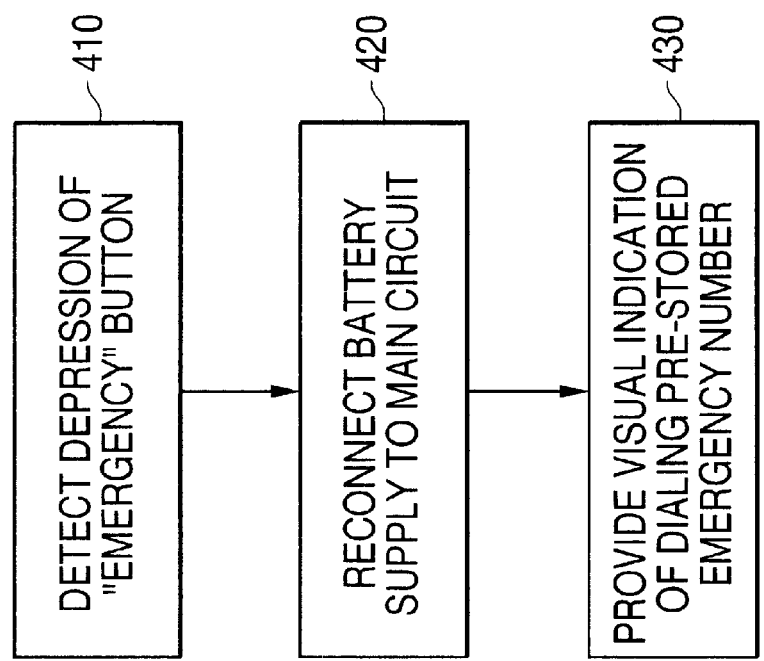
FIG. 4 illustrates a functional diagram of a host controller in response to user depression of an emergency button on a cellular telephone according to an embodiment of the present invention.

If the "EMERGENCY" button 162 is implemented as part of the key input unit 160 shown in FIGS. 1–2, the host controller 110 may be configured to allow the user to simply press the "EMERGENCY" button 162 for emergency use, any time after the battery 120 has already run out of power for purposes of making regular telephone calls. In particular, as shown in FIG. 4, the host controller 110 may be configured to generate, in response to depression of an "EMERGENCY" button 162, a switch control signal S2 to the switch 180 so as to automatically reconnect the residual power supply from the battery 120 to the main circuit 190 so as to enable operation of the cellular telephone 100 only for purposes of making emergency telephone calls at blocks 410–420. After the residual power from the battery 120 is supplied to the main circuit 190, the host controller 110 may provide the user a visual indication of dialing a pre-stored emergency number at block 430. Alternatively, the host controller 110 may provide the user a visual indication of dialing any other regular number.

Figure 5:
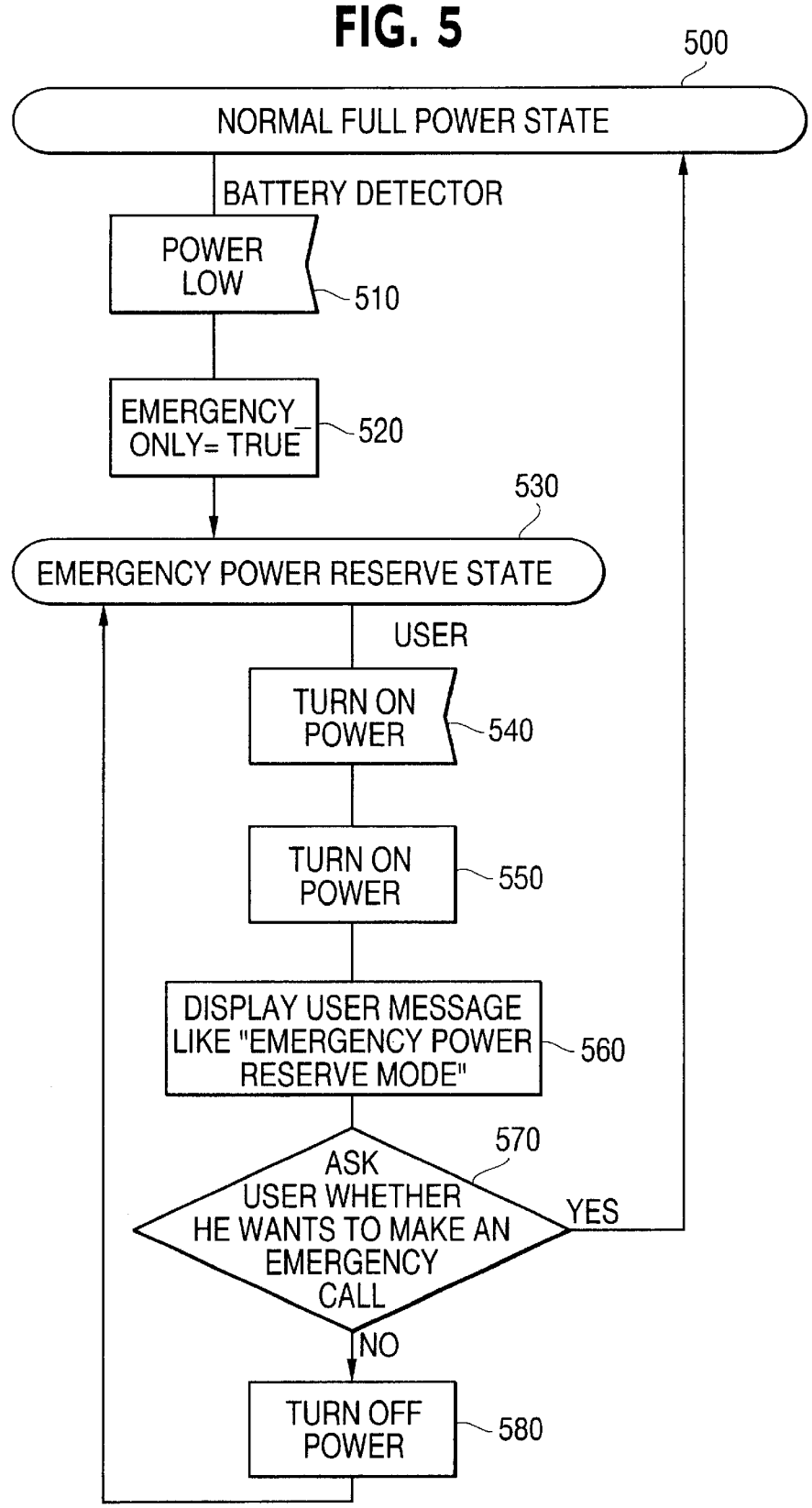
FIG. 5 illustrates a software diagram of a host controller having a special battery reserve feature for emergency use without an "EMERGENCY" button according to an embodiment of the present invention.
Figure 6A:
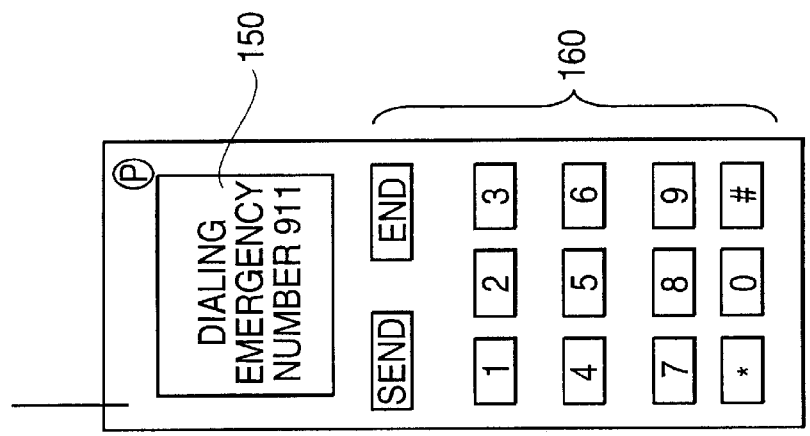
FIGS. 6A–6C illustrate an example cellular telephone having a special battery reserve feature for emergency use without an "EMERGENCY" button according to an embodiment of the present invention.

Even if the "EMERGENCY" button 162 is NOT implemented as part of the key input unit 160 shown in FIGS. 1–2, the host controller 110 may still be configured to allow the user to make an emergency call when the cellular telephone 100 is turned on, any time after the battery 120 has already run out of power for purposes of making regular telephone calls. Software diagram of the host controller 110 having a special battery reserve feature for emergency use without an "EMERGENCY" button are shown in FIGS. 5 and 7. Examples of a cellular telephone 100 having a special battery reserve feature for emergency use without an "EMERGENCY" button according to an embodiment of the present invention are shown in FIGS. 6A–6C.

For example, FIG. 5 illustrates a software diagram of a host controller 110 having a special battery reserve feature for emergency use without an "EMERGENCY" button according to an embodiment of the present invention. The application software described may be written specifically for controlling the power supply from the battery 120, including the use of the special battery reserve feature for emergency use according to an embodiment of the present invention. The host controller 110 allows the cellular telephone 100 to operate between a Normal Full Power State for making regular telephone calls and an Emergency Power Reserve State for making only emergency calls after the battery 120 has already run out of power for purposes of making regular telephone calls. As shown in FIG. 5, the host controller 110 maintains the cellular telephone 100 in a Normal Full Power State at block 500. However, when the battery power is low, that is, when the battery power information $V_d$ indicating the detected power value from the battery detector 130 reaches the power setting information $V_S$ at block 510, the software of the host controller 110 activates an emergency_only flag to TRUE at block 520, and switches the Normal Full Power State to an Emergency Power Reserve State indicating that the cellular telephone 100 is out of battery as shown in FIG. 6A at block 530.

Once the cellular telephone 100 is in an Emergency Power Reserve Mode, only emergency telephone calls are permitted. If the "EMERGENCY" button 162 is NOT implemented as part of the key input unit 160 shown in FIGS. 1–2, then the host controller 110 waits for the user to turn on the cellular telephone 100, via a power key (not shown) at block 540. After the user has turned on the cellular telephone 100, the host controller 110 activates the power supply from the battery 120 at block 550, and provides a visual display of user message such as "Emergency Power Reserve Mode" to alert the user that the cellular telephone 100 is in an Emergency Power Reserve Mode at block 560.

Figure 6B:
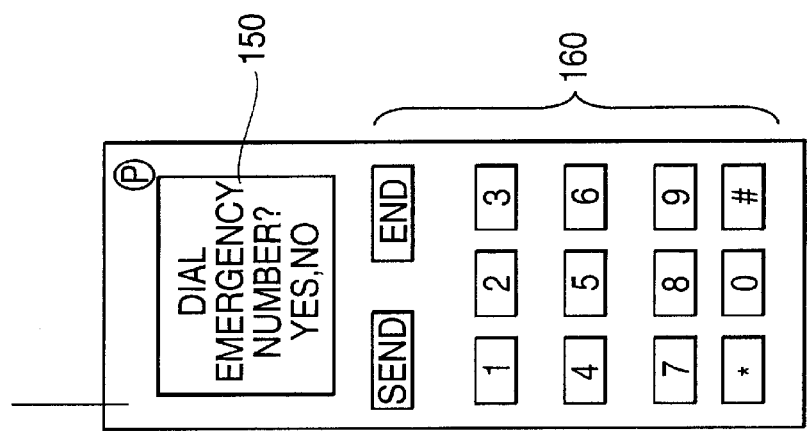
Figure 6C:
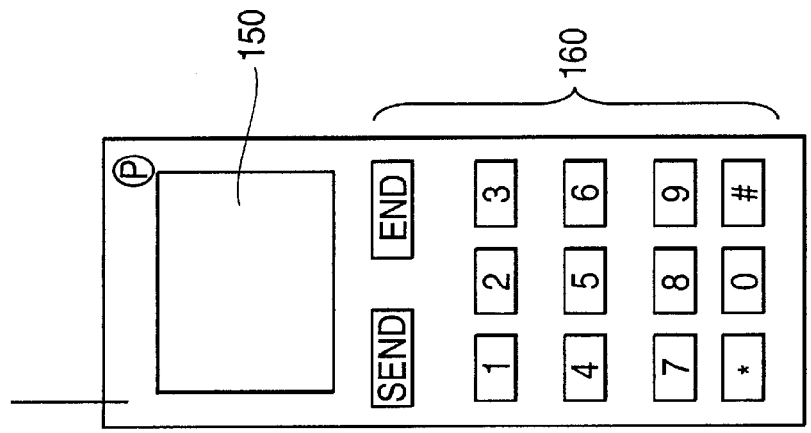

Next the host controller 110 provides a visual display asking the user whether s/he wants to make an emergency call as shown in FIG. 6B, at block 570. If the user does not want to make an emergency call, the host controller 110 automatically shuts off the power supply from the battery 120 at block 580, and returns to the Emergency Power Reserve State at block 530. However, if the user desires to make an emergency call at block 570, the host controller 110 returns to the Normal Full Power State for enabling the user to make the emergency call as shown in FIG. 6C, at block 500.

FIG. 7 illustrates a software diagram of a host controller 110 having a special battery reserve feature for emergency use without an "EMERGENCY" button according to another embodiment of the present invention. As shown in FIG. 7, the host controller 110 also maintains the cellular telephone 100 in a Normal Full Power State at block 700. However, when the battery power is low, that is, when the battery power information $V_d$ indicating the detected power value from the battery detector 130 reaches the power setting information $V_S$ at block 710, the software of the host controller 110 activates an emergency_only flag to TRUE at block 720, and switches the Normal Full Power State to an Emergency Power Reserve State indicating that the cellular telephone 100 is out of battery as shown in FIG. 6A at block 730.

When the cellular telephone 100 is in an Emergency Power Reserve Mode, only emergency telephone calls are permitted. If the "EMERGENCY" button 162 is NOT implemented as part of the key input unit 160 shown in FIGS. 1–2 as described with reference to FIG. 5, the host controller 110 waits for the user to turn on the cellular telephone 100, via a power key (not shown) at block 740. After the user has turned on the cellular telephone 100, the host controller 110 activates the power supply from the battery 120 at block 750, and provides a visual display of user message such as "Emergency Power Reserve Mode" to alert the user that the cellular telephone 100 is in an Emergency Power Reserve Mode at block 760.

Next the host controller 110 provides a visual display asking the user whether s/he wants to make an emergency call as shown in FIG. 6B, at block 770. If the user does not want to make an emergency call, the host controller 110 automatically shuts off the power supply from the battery 120 at block 780, and returns to the Emergency Power Reserve State at block 730. However, if the user desires to make an emergency call at block 770, the host controller 110 automatically dials the pre-stored emergency number (such as E911) for the user as shown in FIG. 6C, at block 790.

Turning now to FIG. 8, an example block diagram of a portable electronic device such as a cellular telephone having a special battery reserve feature for emergency use according to yet another embodiment of the present invention is illustrated. As shown in FIG. 8, two batteries 120A–120B are utilized in the cellular telephone 100. One battery 120A may be used for regular use while another battery 120B may be used exclusively for emergency use. The battery 120B used exclusively for emergency use may be a smaller, commercially available battery. In other words, the regular battery 120A handles regular telephone calls, while the emergency battery 120B handles emergency telephone calls. No need for any battery detector 130 unless battery detection is used for purposes of allowing the user to gauge the remaining battery life and alert the user to the run-down of a battery with either an audible alert message or a vibration for subsequent recharge operations.

As described from the foregoing, the special battery reserve feature of the portable electronic device such as the cellular telephone according to an embodiment of the present invention advantageously allows the user to make an emergency call, such as E911 or any other pre-stored emergency number, even if the battery has run down. As a result, the user is always provided with access to such a cellular telephone in cases of emergency regardless of the condition of its battery.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of portable electronic devices, including, but is not limited to, analog and digital mobile or cellular phones, pagers, wireless portable digital assistants (PDAs), and other portable consumer electronics. More importantly, hardware equivalence may be implemented in lieu of software-based special battery reserve feature for emergency use. Further, many other modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A portable telephone comprising:
   a battery detector arranged to detect a power supply of a battery serving as a power source of the portable telephone and produce battery power information $V_d$ indicating a detected power value;

a memory comprising a program storage area which stores an application software including a special battery reserve for emergency use, and a data storage area which serves as a working memory for storing relevant information, including power setting information $V_S$ of the battery; and a host controller arranged to control operations of the portable telephone, including to disconnect the power supply from the battery, when the battery power information $V_d$ indicating the detected power value approaches the power setting information $V_S$ of the battery, and to re-connect the power supply from the battery for emergency use, when said special battery reserve is activated.

2. The portable telephone as claimed in claim 1, further comprising:

a display unit arranged to provide a visual display of information necessary for a user to operate the portable telephone, including said special battery reserve for emergency use;

a key input unit arranged to allow the user to input relevant information;

an alarm generator arranged to drive a speaker and a buzzer for sounding an alarm or a vibration to alert their user of a low battery power, when the battery power information $V_D$ indicating the detected power value approaches the power setting information $V_S$ of the battery; apd a switch arranged to disconnect or re-connect the power supply from the battery to a main circuit of the portable telephone.

3. The portable telephone as claimed in claim 2, wherein said host controller comprises a comparator arranged to make a comparison between the battery power information $V_d$ indicating the detected power value and the power setting information $V_S$ set by the user, and generate a low battery indication to the alarm generator to alert the user of said low battery indication, when the battery power information $V_d$ indicating the detected power value reaches the power setting information $V_S$.

4. The portable telephone as claimed in claim 1, wherein said battery corresponds to any one of an Alkaline, Nickel Cadmium (NiCD), Nickel Metal Hydride (NiMH), Lithium Ion (Li-Ion) and Zinc Air type of battery.

5. The portable telephone as claimed in claim 1, wherein said key input unit further incorporates a special "EMERGENCY" button implemented to function for emergency use, when the battery power information $V_d$ indicating the detected power value from the battery detector approaches the power setting information $V_S$ of the battery.

6. The portable telephone as claimed in claim 2, wherein said memory, said alarm generator, said switch and said main circuit are integrated as part of said host controller so as to control operations of the portable telephone, including said special battery reserve for emergency use.

7. The portable telephone as claimed in claim 1, wherein said memory further stores alarm setting information set by the user, via said key input unit, for continuous sounding of an alarm, intermittent sounding of an alarm, and flashing of a light, when the battery power information $V_d$ indicating the detected power value from the battery detector approaches the power setting information $V_S$ of the battery.

8. The portable telephone as claimed in claim 7, wherein said key input unit arranged to permit the user to input and vary the power setting information and the alarm setting information for storage in said memory.

9. The portable telephone as claimed in claim 1, wherein said host controller is configured to operate between a Normal Full Power State for making regular telephone calls and an Emergency Power Reserve State for making only emergency calls after the battery has run out of power for purposes of making regular telephone calls.

10. The portable telephone as claimed in claim 9, wherein said host controller is configured to:

activate an emergency_only flag to TRUE, and switch the Normal Full Power State to an Emergency Power reserve State indicating that the cellular telephone is out of battery, when the battery power information $V_d$ indicating the detected power value reaches the reference power setting information $V_S$ of the battery; wait for the user to turn on the cellular telephone, via the key input unit;

after the user has turned on the cellular telephone, activate the power supply from the battery and provide a visual display of user message such as "Emergency Power Reserve Mode" to alert the user that the cellular telephone is in an Emergency Power Reserve Mode;

provide a visual display making the user whether the user desires an emergency call;

if the user does not desire to make an emergency call, automatically shut off the power supply from the battery and return to the Emergency Power Reserve State; and alternatively, if the user desires to make an emergency call, return to the Normal Full Power State to permit the user to make the emergency call.

11. The portable telephone as claimed in claim 9, wherein said host controller is configured to:

activate an emergency_only flag to TRUE, and switch the Normal Full Power State to an Emergency Power Reserve State indicating that the cellular telephone is out of battery, when the battery power information $V_d$ indicating the detected power value reaches the reference power setting information $V_S$ of the battery;

wait for the user to turn on the cellular telephone, via the key input unit; after the user has turner on the cellular telephone, activate the power supply from the battery and provide a visual display of user message such as "Emergency Power Reserve Mode" to alert the user that the cellular telephone is in an Emergency Power Reserve Mode;

provide a visual display asking the user whether the user desires an emergency call;

if the user does not desire to make an emergency call, automatically shut off the power supply from the battery and return to the Emergency Power Reserve State; and alternatively, if the user desires to make an emergency call, automatically dial a pre-stored emergency number to make the emergency call.

12. A portable telephone comprising:

a first battery arranged to supply battery power for making regular telephone calls;

a second battery arranged independently from the first battery, to supply battery power for making emergency telephone calls;

a memory which stores and application software; and a controller executed by said application software and arranged to control operations of the portable telephone, including using the battery power of said first battery for making regular telephone calls, and using the battery power of said second battery for making emergency calls.

13. A method for reserving a special portion of a battery for emergency use in a portable telephone, said method comprising:

detecting a power supply of a battery serving as a power source of the portable telephone and generating battery power information $V_d$ indicating a detected power value;

when the battery power information $V_d$ indicating the detected power value approaches the power setting information $V_S$ of the battery, disconnecting the power supply from the battery, and switching from a Normal Full Power State to an Emergency Power Reserve State indicating that the portable telephone is out of battery;

after the user has turned on the cellular telephone, re-connecting the power supply from the battery, and providing a visual display of user message to alert the user that the cellular telephone is in an Emergency Power Reserve Mode, and user message to ask the user whether the user desires an emergency call;

if the user does not desire to make an emergency call, automatically shutting off the power supply from the battery and returning to the Emergency Power Reserve State; and alternatively, if the user desires to make an emergency call, returning to the Normal Full Power State to permit the user to make the emergency call.

14. The method as claimed in claim 13, wherein, if the user desires to make an emergency call, a pre-stored emergency number is automatically dialed to make the emergency call.

15. A portable telephone comprising:

a battery detector arranged to detect a power supply of a battery and generate battery power information $V_D$ indicating a detected power value;

a memory comprising a program storage area which stores an application software including a special battery reserve for emergency use, and a data storage area which serves as a working memory for storing relevant information, including power setting information $V_S$ set by a user, via a key input unit;

an alarm generator arranged to generate an alarm or a vibration to alert the user of a low battery power, when the battery power information $V_D$ indicating the detected power value approaches the power setting information $V_S$ of the battery; and a switch arranged to disconnect or re-connect the power supply from the battery to a main circuit of the portable telephone; and a host controller arranged to control operations of the portable telephone, including controlling the switch to disconnect the power supply from the battery when the battery power information $V_d$ indicating the detected power value approaches the power setting information $V_S$ of the battery, and to re-connect the power supply from the battery for emergency use when said special battery reserve is activated.

16. The portable telephone as claimed in claim 15, wherein said host controller comprises a comparator arranged to make a comparison between the battery power information $V_d$ indicating the detected power value and the power setting information $V_S$ set by the user, and generate a low battery indication to the alarm generator to alert the user of said low battery indication, when the battery power information $V_d$ indicating the detected power value reaches the reference power setting information $V_S$.

17. The portable telephone as claimed in claim 16, wherein said key input unit further incorporates a special "EMERGENCY" button implemented to function for emergency use, when the battery power information $V_d$ indicating the detected power value approaches the power setting information $V_S$ of the battery.

18. The portable telephone as claimed in claim 16, wherein memory further stores alarm setting information set by the user, via said key input unit, for continuous sounding of an alarm, intermittent sounding of an alarm, and flashing of a light, when the battery power information $V_d$ indicating the detected power value approaches the power setting information $V_S$ of the battery.

19. The portable telephone as claimed in claim 16, wherein said host controller is configured to operate between a Normal Full Power State for making regular telephone calls and an Emergency Power Reserve State for making only emergency calls after the battery has run out of power for purposes of making regular telephone calls.

20. A method of reserving a special portion of a battery for emergency use in a portable telephone, said method comprising:

when a power supply of the battery approaches a predetermined level, disconnecting the power supply from the battery, and switching from a Normal Full Power State to an Emergency Power Reserve State indicating that the portable telephone is out of battery;

after the user has turned on the cellular telephone, re-connecting the power supply from the battery, and providing a visual display of user message to alert the user that the cellular telephone is in an Emergency Power Reserve Mode, and user message to ask the user whether the user desires an emergency call;

if the user does not desire to make an emergency call, automatically shutting off the power supply from the battery and returning to the Emergency Power Reserve State; and alternatively, if the user desires to make an emergency call, returning to the Normal Full Power State to permit the user to make the emergency call.

21. The method as claimed in claim 20, wherein, if the user desires to make an emergency call, a pre-stored emergency number is automatically dialed to make the emergency call.

* * * * *

UNITED STATES PATENT AND TRADEMARK OFFICE
CERTIFICATE OF CORRECTION

| PATENT NO. | : 6,668,179 B2 |
|---|---|
| APPLICATION NO. | : 09/731734 |
| DATED | : December 23, 2003 |
| INVENTOR(S) | : Jiang |

It is certified that error appears in the above-identified patent and that said Letters Patent is hereby corrected as shown below:

In column 9, lines 27-28, in Claim 2, delete "their user" and insert -- the use --, therefor.

In column 9, line 31, in Claim 2, delete "apd" and insert -- and --, therefor.

In column 10, line 13, in Claim 10, delete "reserve" and insert -- Reserve --, therefor.

In column 10, line 24, in Claim 10, delete "making" and insert -- asking --, therefor.

In column 10, line 43, in Claim 11, delete "turner" and insert -- turned --, therefor.

In column 10, line 65, in Claim 12, after "stores" delete "and" and insert -- an --, therefor.

In column 11, line 45, in Claim 15, after "by" delete "a" and insert -- the --, therefor.

In column 11, line 47, in Claim 15, delete "low" and insert -- lower --, therefor.

Signed and Sealed this
Fifteenth Day of February, 2011

David J. Kappos
*Director of the United States Patent and Trademark Office*